United States Patent Office 3,228,605
Patented Jan. 11, 1966

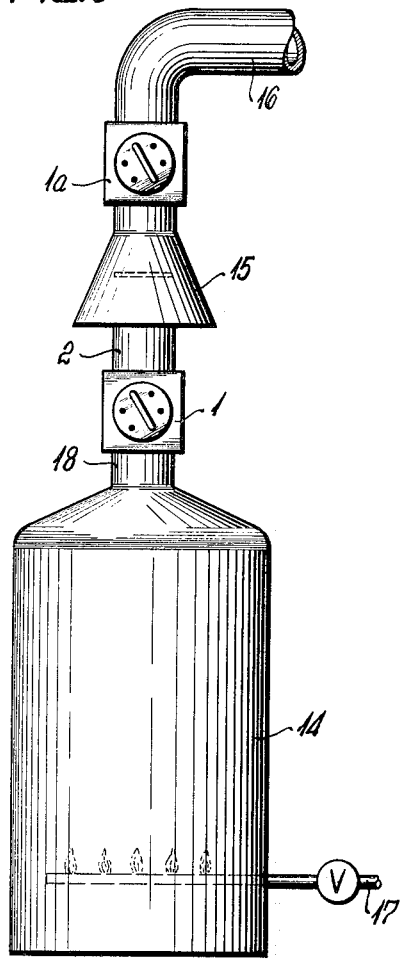
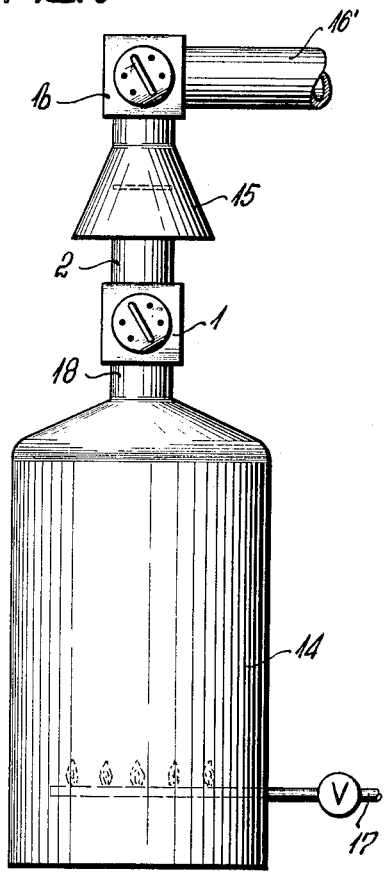

3,228,605
AUTOMATIC FLUE DAMPER
Alphons Diermayer, 6 Baumlstrasse, and Luitpold
Kutzner, 100 Furstenriederstrasse, both of Munich,
Germany
Filed Mar. 23, 1964, Ser. No. 353,712
10 Claims. (Cl. 236—93)

This invention relates to dampers for the flues of combustion chambers, and more particularly to a damper arrangement which automatically connects the combustion chamber to a flue in response to the heat of the combustion gases, but blocks the flue in the absence of hot gases.

It is known to install bi-metal elements in a flue. The elements bend under the thermal stresses produced upon contact with the hot combustion gases, and the movement of a portion of the bi-metal element is transmitted by a linkage to a hingedly supported damper plate which normally obstructs the flue, and the flue passage is thereby opened.

The object of the invention is the provision of an automatically operating damper arrangement which is simpler and therefore more reliable in its operation than the afore-described known device.

A more specific object is the provision of an automatic flue damper arrangement which avoids hinged connections and does not rely on transmission of motive power from a bi-metal element by a linkage to a damper plate.

In its basic aspects, the invention combines the several functions of the conventional arrangement in a single element, a laminated damper plate which has two fixedly bonded sheet layers. The layers consist of metals having substantially different coefficients of thermal expansion. Such a plate, when heated from normal room temperature, bends to a flexed position. One portion of the damper plate of the invention is fixedly fastened in a conduit which connects the combustion chamber to a flue or the like, and a second damper plate portion normally extends transversely of the passage in the conduit and blocks the same. Upon contact with the hot combustion gases, the free second plate portion bends from its normal position into one in which it opens the passage.

Other features and many of the attendant advantages of this invention will become apparent from the following detailed description of preferred embodiments when taken in conjunction with the attached drawings in which:

FIG. 5 shows the combustion chamber and associated elements of a gas heating plant equipped with damper arrangements of the invention, the view being in elevational section; and FIG. 6 illustrates a modification of the apparatus of FIG. 5.

Figure 1:
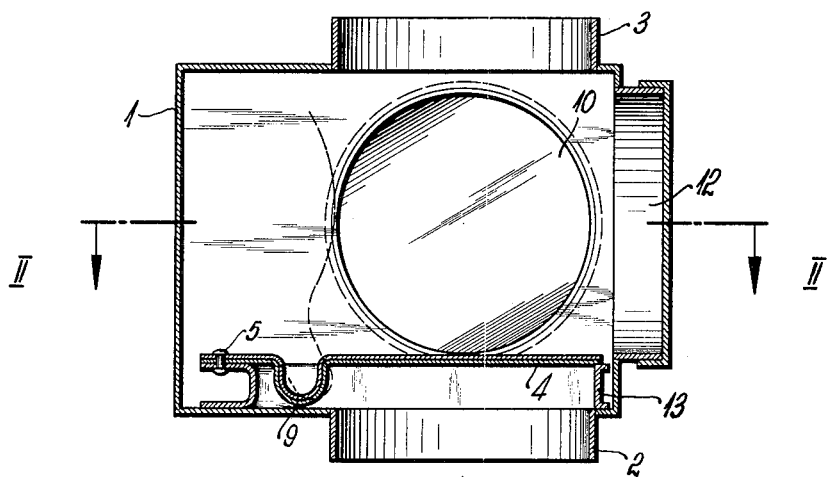
FIG. 1 shows a first damper arrangement of the invention in elevational section on the line I—I in FIG. 2.
Figure 2:
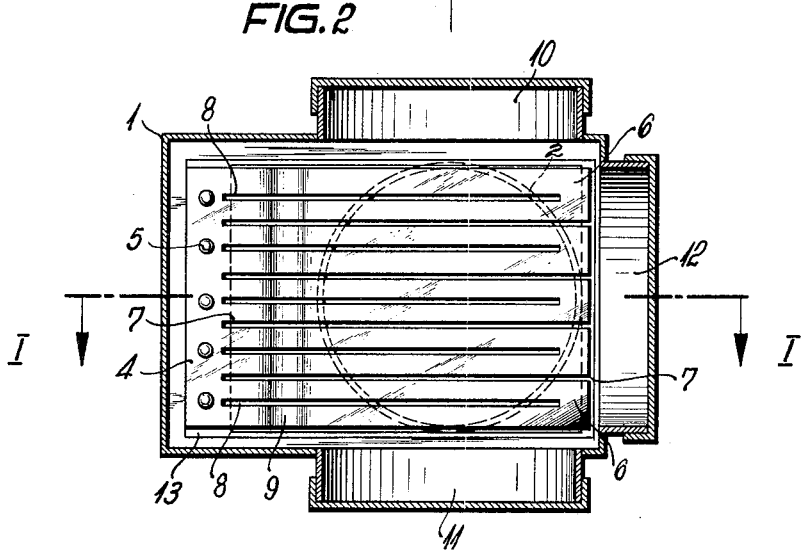
FIG. 2 shows the device of FIG. 1 in horizontal plan section on the line II—II.

Referring now to the drawing in detail, and initially to FIGS. 1 and 2, there is seen a sheet metal housing 1. A short cylindrical inlet duct 2 enters the housing 1 from below, and a similar, coaxial outlet duct 3 extends upward from the housing top. The passage of gas through the housing from the inlet duct 2 to the outlet duct 3 is controlled by a damper plate 4 which consists of two sheet layers of metals having dissimilar coefficients of expansion. The two layers are fixedly bonded to each other by rolling, welding, or in any other manner conventionally employed in the manufacture of bi-metal plates.

The plate 4 has a rectangular overall shape. It is somewhat smaller than the plan cross section of the housing 1. One edge of the plate 4 is fastened to a flange of a rectangular frame 13 by rivets 5. The frame 13 is mounted in the housing 1 in sealing engagement with the housing bottom so that the damper plate 4 normally covers the orifice of the inlet duct 2 as shown in FIG. 1 in fully drawn lines.

Four parallel slots 7 which start from the free edge of the plate 4 remote from the rivets 5 divide the plate portion above the duct 2 into five long and narrow strips 6. Each strip is again divided by a slot 8 parallel to the slots 7, but not extending to either transverse edge of the plate 4.

In the normal position of the plate 4 shown in fully drawn lines, the portion of the plate which is riveted to the frame 13 and the portion which covers the orifice of the duct 2 extend in a common plane. They are connected by an integral portion 9 of the plate 4 whose cross section resembles one half turn of a circle or of an ellipse. The convex surface of the normally arcuately bent plate portion 9 normally faces the stream of combustion gases indicated by an arrow.

The metal layer having the higher coefficient of thermal expansion is on the underside of the plate 4, as viewed in FIG. 1. The slots 7, 8 provide the minimum of draft necessary for starting combustion in the associated burner, not visible in FIGS. 1 and 2, and to draw the hot combustion gases toward the plate 4. The greater expansion of the lower metal layer causes the free portion of the plate to bend upward into the position indicated in broken lines in FIG. 1.

The normally bent plate portion 9 contributes materially to the speed with which the damper plate moves into the open position upon contact with the hot combustion gases, and increases the angle through which the plate is flexed upon heating so that it is entirely removed from the path of the gases as is evident from FIG. 1.

Connecting ducts 10, 11, 12 extend outward of the housing 1 in three horizontal directions offset 90° relative to each other. They greatly facilitate the installation of the device, as will presently become apparent. In the embodiment shown in FIGS. 1 and 2, the horizontal ducts 10, 11, 12 are capped, and any one of the caps may be removed if it is desired to inspect the interior of the apparatus or to clean it.

In order to accommodate the plate 4 in its open position, the height of the housing 1 must be somewhat greater than the diameter of the duct 2. Where overhead room is limited, or where ducts of relatively large diameters are to be controlled by an automatic damper, the embodiment of the invention illustrated in FIGS. 3 and 4, and modifications thereof, are preferred.

In the modified damper arrangement, two bi-metal plates 4a, 4b are mounted on opposite flanged edges of a rectangular frame 13' within a housing 1' by means of rivets 5. Each plate is divided into ten narrow strips 6 by open-ended slots 7. Each strip 6 is provided with a slot 8 whose ends are closed. Arcuately bent portions 9 of the plates 4a, 4b are outside the straight path of gas flow from an inlet duct 2 to an outlet duct 3. Two opposite horizontal ducts 10, 11 are capped.

Figure 3:
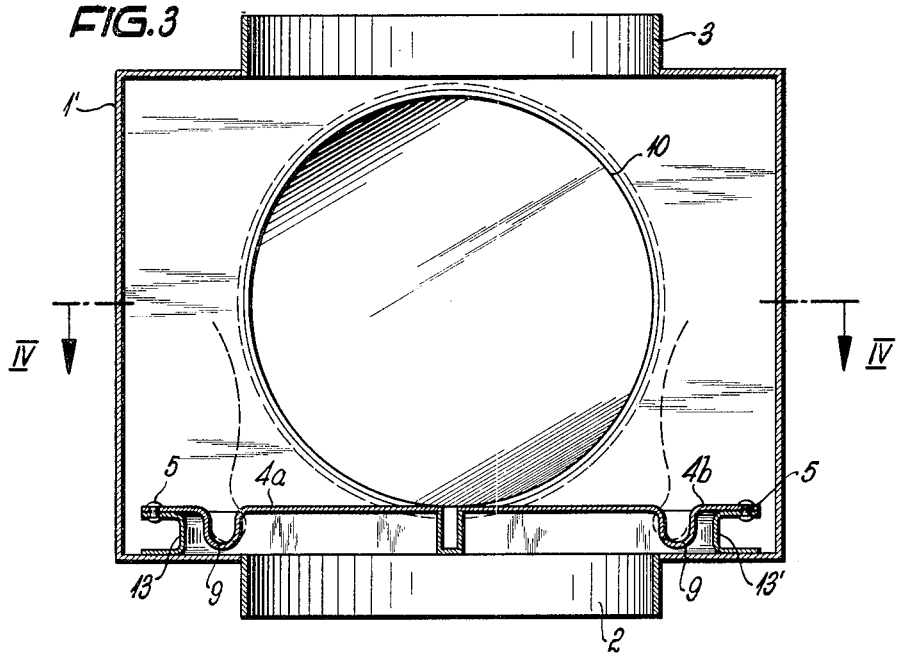
FIG. 3 illustrates a second damper arrangement in a view corresponding to that of FIG. 1, that is, in elevational section on the line III—III in FIG. 4.
Figure 4:
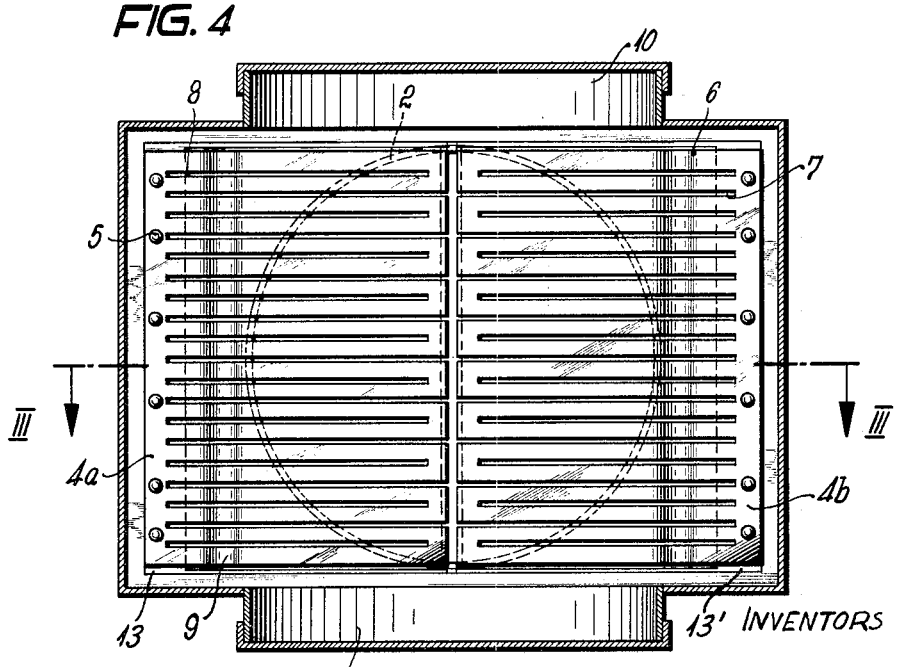
FIG. 4 is a sectional plan view of the device of FIG. 3 taken on the line IV—IV.

As shown in broken lines in FIG. 3, the two bi-metal plates 4a, 4b swing in opposition directions out of the path of the hot combusion gases when their temperature rises. It is evident from FIG. 3 that the height of the housing 1' can be reduced by one half if the horizontal ducts 10, 11 are omitted. These ducts, however, are valuable for the convenient installation of the automatic damper arrangement as is seen from comparison of FIGS. 5 and 6.

Both figures show the combustion chamber 14 of a heating apparatus, such as a water-heater, not otherwise illustrated. A gas burner 17 in the chamber 14 generates hot combustion gases which rise toward a discharge pipe 18 on which a damper arrangement of the invention is mounted, only a housing 1 being shown on the smaller scale of FIGS. 5 and 6.

A conventional, downwardly open deflector 15 is mounted above the outlet duct 2 of the damper housing 1, and leads into another damper housing 1a which encloses a damper arrangement identical with that seen in FIGS. 1 and 2. As shown in FIG. 5, the last-mentioned damper housing is connected to a non-illustrated flue by a smoke pipe 16 which is a sheet metal elbow. The pipe 16 extends above the damper housing 1a. In the arrangement shown in FIG. 6, a straight smoke pipe 16' is connected to one of the short horizontal ducts on the damper housing 1b. It is evident that the arrangement illustrated in FIG. 6 requires less head room under otherwise identical conditions, and does not need a curved smoke pipe.

FIGS. 5 and 6 are merely illustrative of the manner in which the damper arrangements of the invention may be connected to combustion chambers, but the multiple connecting ducts on the damper housings permit numerous other combinations which will be apparent to those skilled in the art. The bi-metal damper plates of the invention do not obstruct flow of gas through any one of the connecting ducts when in the thermally flexed condition. They may be installed for movement of the damper plate in any plane and in any direction.

Two damper arrangements are shown in each of FIGS. 5 and 6 for obstructing gas flow from the flue into the space surrounding the heater, and from that space into the combustion chamber 14. If so desired, one of the two damper arrangements may be omitted.

The automatic dampers of the invention do not require servicing and operate reliably over many years. When in the open position, the damper plates do not interfere with discharge of combustion gases into the flue regardless of the direction in which the combustion gases are withdrawn from the damper housing.

Various modifications are contemplated and may obviously be resorted to by those skilled in the art without departing from the spirit and scope of the invention as hereinafter defined by the appended claims, as only preferred embodiments thereof have been disclosed.

What is claimed is:

1. A damper arrangement for a combustion chamber comprising, in combination:
   (a) a conduit defining a passage therethrough; and
   (b) a laminated damper plate having two metallic, fixedly bonded sheet layers of substantially different coefficient of thermal expansion, whereby said plate bends from a normal position to a flexed position when heated from a normal temperature,
      (1) said plate having a first portion fixedly fastened to said conduit and a second portion normally in a position transverse of said passage to obstruct the same,
      (2) said plate being arranged in said conduit for movement of said second plate portion from said normal position thereof to a position in which said second portion opens said passage when said plate is heated from said normal temperature;
      (3) said plate being formed with a plurality of elongated slots transversely spaced from each other, said slots extending in a direction from the second portion of the plate toward the first portion thereof.

2. An arrangement as set forth in claim 1, wherein said second plate portion has a free edge remote from said first plate portion, said slots extending inward from said free edge toward said first plate portion, whereby said slots have one open end.

3. An arrangement as set forth in claim 2, wherein said second plate portion is formed with a plurality of additional slots interposed between respective ones of said open-ended slots, each additional slot having a terminal portion inwardly spaced from said free edge, and extending inward in said second plate portion from the respective terminal portion.

4. An arrangement as set forth in claim 1, wherein said plate has a third portion integrally connecting said first and second portions, said third portion being of arcuate cross section at said normal temperature, and said second portion being substantially flat at said normal temperature.

5. An arrangement as set forth in claim 4, wherein said first and second portions extend angularly away from said third portion.

6. An arrangement as set forth in claim 4, wherein said arcuate cross section extends over not substantially less than one half of a turn.

7. An arrangement as set forth in claim 1, wherein said conduit includes a housing, an inlet duct, an outlet duct, and at least one other duct, said ducts having respective axes and communicating with said housing.

8. An arrangement as set forth in claim 7, wherein the axes of said inlet and outlet ducts extend in a common direction.

9. An arrangement as set forth in claim 7, wherein the axes of said inlet and outlet ducts are transverse of each other.

10. A damper arrangement for a combustion chamber comprising, in combination:
   (a) a conduit defining a passage therethrough; and
   (b) two laminated damper plates, each plate having two metallic, fixedly bonded sheet layers of substantially different coefficients of thermal expansion, whereby each plate bends from a normal position to a flexed position when heated from a normal temperature,
      (1) said plates having respective first portions fixedly fastened to respective opposite portions of said conduit spaced from each other transversely of said passage, and respective second portions normally extending from the corresponding first portion toward the first portion of the other plate, said second portions normally jointly obstructing said passage.
      (2) said plates being arranged in said conduit for movement of the respective second plate portions thereof from said normal obstructing positions thereof to a position in which said second plate portions open said passage when said plates are heated from said normal temperature;
      (3) each plate being formed with a plurality of elongated slots transversely spaced from each other, said slots extending in a direction from the second portion of the plate toward the first portion thereof.

References Cited by the Examiner
UNITED STATES PATENTS

| 2,262,460 | 11/1941 | Johnson et al. | 236—96 X |
| 2,339,614 | 1/1944 | Breese | 236—96 X |
| 2,437,287 | 3/1948 | Woods | 236—93 X |
| 2,673,687 | 3/1954 | Alban et al. | 236—93 |
| 2,763,433 | 9/1956 | Hill | 236—93 |

FOREIGN PATENTS 590,092 7/1947 Great Britain.

JAMES W. WESTHAVER, *Primary Examiner.*